(12) United States Patent
Moyer et al.

(10) Patent No.: US 7,584,344 B2
(45) Date of Patent: Sep. 1, 2009

(54) INSTRUCTION FOR CONDITIONALLY YIELDING TO A READY THREAD BASED ON PRIORITY CRITERIA

(75) Inventors: William C. Moyer, Dripping Springs, TX (US); Gary L. Whisenhunt, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 55 days.

(21) Appl. No.: 11/381,284

(22) Filed: May 2, 2006

(65) Prior Publication Data

US 2007/0260863 A1 Nov. 8, 2007

(51) Int. Cl.
*G06F 9/40* (2006.01)
(52) U.S. Cl. .................................... 712/220
(58) Field of Classification Search ............... 712/228, 712/220; 718/103, 108, 104
See application file for complete search history.

(56) References Cited

U.S. PATENT DOCUMENTS

| | | | | |
|---|---|---|---|---|
| 5,452,452 A | * | 9/1995 | Gaetner et al. | 718/103 |
| 5,996,058 A | * | 11/1999 | Song et al. | 712/31 |
| 6,128,672 A | * | 10/2000 | Lindsley | 710/19 |
| 6,212,544 B1 | * | 4/2001 | Borkenhagen et al. | 718/103 |
| 6,223,277 B1 | * | 4/2001 | Karguth | 712/224 |
| 6,854,504 B2 | * | 2/2005 | Nien | 160/176.1 R |
| 6,857,063 B2 | | 2/2005 | Moyer | |
| 6,941,175 B2 | * | 9/2005 | Amrhein et al. | 700/23 |
| 6,988,268 B2 | * | 1/2006 | Zuberi | 718/103 |
| 2004/0163083 A1 | | 8/2004 | Wang et al. | |
| 2006/0117316 A1 | * | 6/2006 | Cismas et al. | 718/103 |

FOREIGN PATENT DOCUMENTS

EP 1339222 A2 8/2003

OTHER PUBLICATIONS

Wang et al "Helper Threads via Virtual Multithreading On An Experimental Itanium 2 Processor-based Platform" Asplos, 2004 pp. 144-155.

* cited by examiner

*Primary Examiner*—David J Huisman
(74) *Attorney, Agent, or Firm*—Susan C. Hill; Ranjeev K. Singh

(57) ABSTRACT

An integrated circuit (10) has a conditional yield instruction (305) which may be used to conditionally yield execution of a currently active thread based on priority and status of other threads. In one embodiment, an I bit 304 may be used to designate whether the priority selection bits (50) are stored in the instruction itself. If the priority selection bits (50) are not stored in the instruction itself, a portion of the instruction (302) may be used to store a location indicator which indicates where the priority selection bits (50) are located (e.g. register file 22).

15 Claims, 4 Drawing Sheets

```
IF I=0 THEN TEMP ← (rB) 59:63
ELSE TEMP ← rel_pri
IF TEMP=0 THEN {
    IF ANOTHER THREAD IS READY TO RUN THEN THREAD SWITCH
}ELSE IF TEMP=1 THEN {
    IF ANOTHER THREAD OF HIGHER PRIORITY IS READY TO RUN THEN THREAD SWITCH
}ELSE IF TEMP=2 THEN {
    IF ANOTHER THREAD WITH AT LEAST EQUAL PRIORITY IS READY TO RUN THEN THREAD SWITCH
}ELSE IF TEMP=3 THEN {
    IF ANOTHER THREAD WITH A PRIORITY AT LEAST EQUAL TO THE CURRENT
    PRIORITY-1 IS READY TO RUN THEN THREAD SWITCH
}ELSE THREAD SWITCH
```

INSTRUCTION FOR CONDITIONALLY YIELDING TO A READY THREAD BASED ON PRIORITY CRITERIA

FIELD OF THE INVENTION

The present invention relates generally to an integrated circuit, and more particularly to an integrated circuit that has a conditional yield instruction.

RELATED ART

Multi-threading and context switching can be used to increase the performance of a processor. A processor may be defined as circuitry that executes instructions and performs a processing function. An instruction thread may be defined as a set of instructions belonging to a particular context. An instruction thread may be independent of other instruction threads. Threads can be generated from a single software program that exhibits sufficient parallelism or from different programs. Data and control dependencies between instructions in a single thread may prevent simultaneous issuing of instructions to different functional blocks of circuitry within the processor. However, instructions from different threads are independent of each other and can be issued to a plurality of functional blocks concurrently.

More efficient ways of switching between threads or contexts is desirable and may improve the performance of a processor which uses multi-threading or context switching.

BRIEF DESCRIPTION OF THE DRAWINGS

The present invention is illustrated by way of example and not limited by the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

Figure 1:
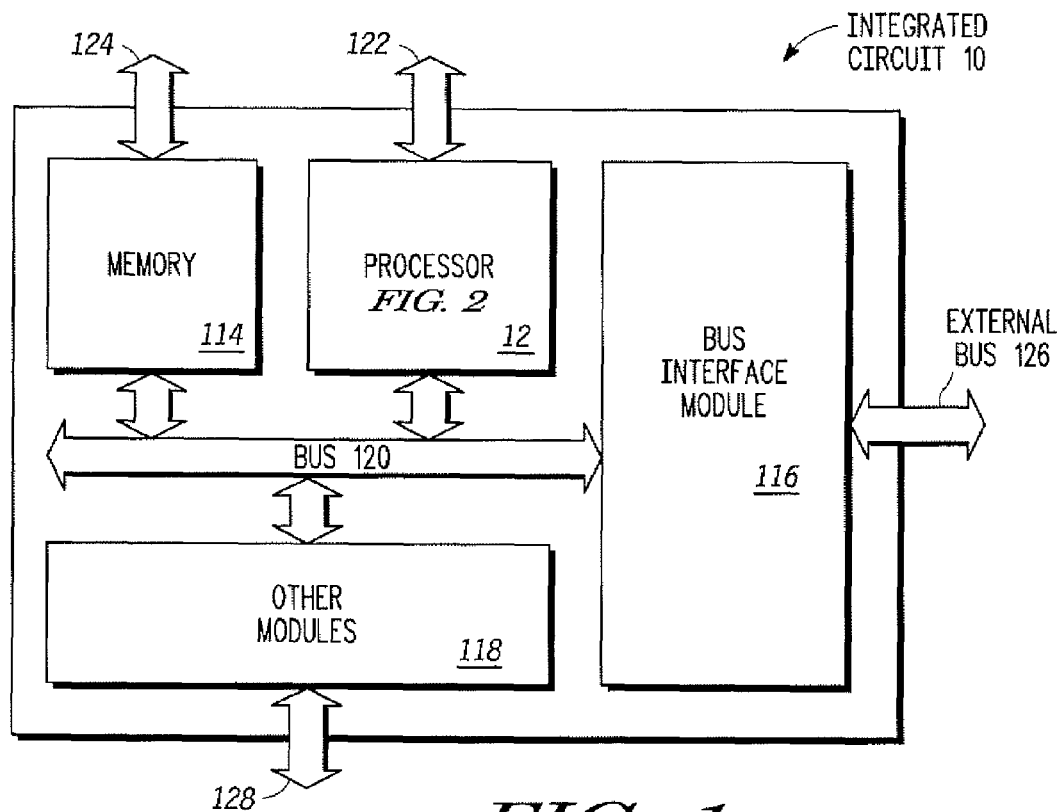
FIG. 1 illustrates, in block diagram form, an integrated circuit in accordance with one embodiment of the present invention.

FIG. 1 illustrates an integrated circuit 10. In one embodiment, integrated circuit 10 includes a processor 12, memory 114, bus interface module 116, and other modules 118, which are all bi-directionally coupled to each other by way of bus 120. Bus interface module 116 may be coupled external to integrated circuit 10 by way of external bus 126. Other modules 118 are optionally coupled external to integrated circuit 10 by way of one or more integrated circuit terminals 128. Memory 114 is optionally coupled externally to integrated circuit 10 by way of one or more integrated circuit terminals 124. Processor 12 is optionally coupled external to integrated circuit 10 by way of one or more integrated circuit terminals 122.

Still referring to FIG. 1, alternate embodiments of the present invention may use any type of structure for integrated circuit 10. In addition, integrated circuit 10 may perform a wide variety of functions. For example, integrated circuit 10 may use a RISC (Reduced Instruction Set Computer) architecture, may use a Harvard architecture, may be a vector processor, may be a SIMD (Single Instruction Multiple Data) processor, may perform floating point arithmetic, may perform digital signal processing computations, etc. In addition, alternate embodiments may not have one or more of memory 114, bus interface 116, other modules 118, bus 120, or integrated circuit terminals 122, 124, 126, or 128. Alternate embodiments of integrated circuit 10 may comprise a plurality of identical or different processors 12. Other modules 118 may include any type of circuitry, such as, for example, timers, analog to digital converters, driver circuitry, serial interfaces, etc. Memory 114 may include one or memories of any combination of memory types.

Figure 2:
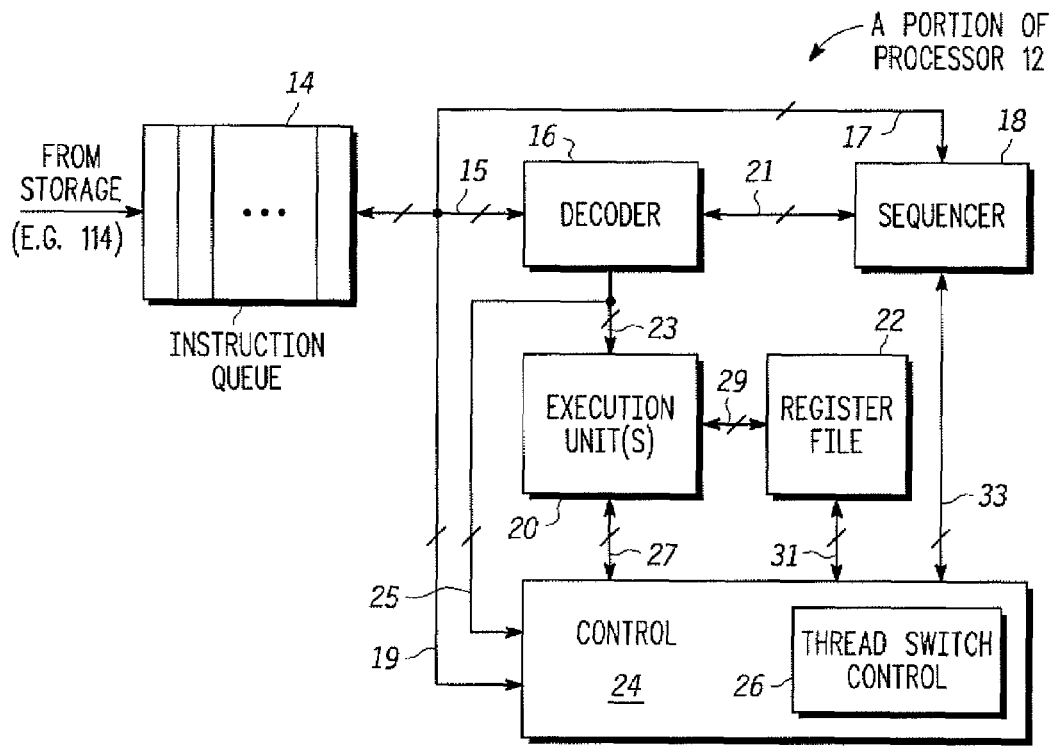
FIG. 2 illustrates, in block diagram form, a portion of processor 12 of FIG. 1 in accordance with one embodiment of the present invention.

FIG. 2 illustrates one embodiment of a portion of processor 12 of FIG. 1. In the illustrated embodiment, processor 12 has an instruction queue 14 that is bi-directionally coupled to decoder 16 by way of one or more conductors 15, is bi-directionally coupled to sequencer 18 by way of one or more conductors 17, and is bi-directionally coupled to control circuitry 24 by way of one or more conductors 19. Decoder 16 is bi-directionally coupled to sequencer 18 by way of one or more conductors 21. Decoder 16 provides signals to one or more execution units 20 by way of conductors 23. Decoder 16 provides signals to control circuitry 24 by way of one or more conductors 25. Execution units 20 is bi-directionally coupled to control circuitry 24 by way of one or more conductors 27, and is bi-directionally coupled to register file 22 by way of one or more conductors 29. Register file 22 is bi-directionally coupled to control circuitry 24 by way of one or more conductors 31. Sequencer 18 is bi-directionally coupled to control circuitry 24 by way of one or more conductors 33. Each one of execution unit(s) 20 includes one or more functional blocks that perform a processing function.

Figure 3:
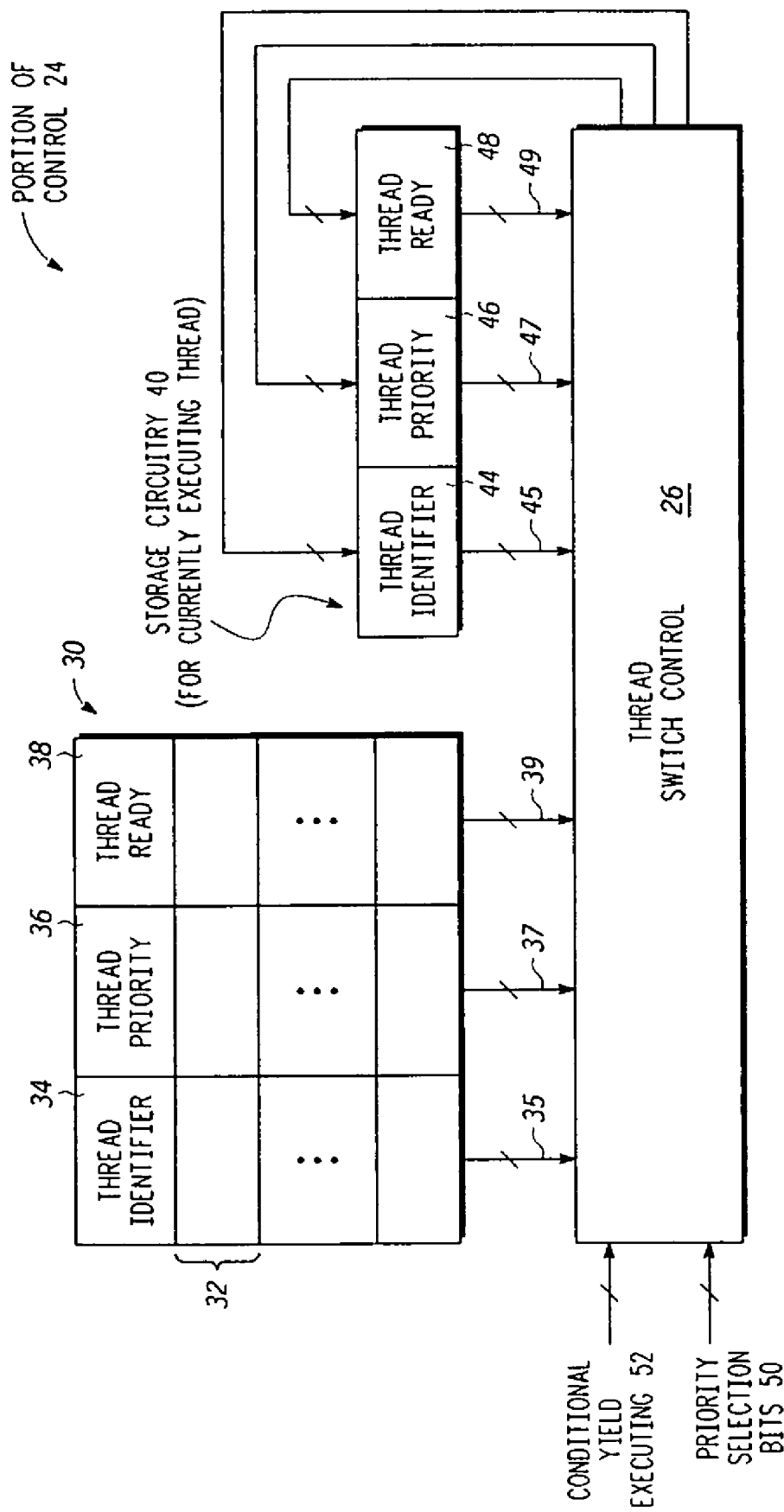
FIG. 3 illustrates, in block diagram form, a portion of control circuitry 24 of FIG. 2 in accordance with one embodiment of the present invention.

FIG. 3 illustrates one embodiment of a portion of control circuitry 24 of FIG. 2. In the illustrated embodiment, control circuitry 24 has storage circuitry 30 for storing thread state information. In one embodiment, the thread state information stored in storage circuitry 30 for each thread comprises a thread identifier portion 34, a thread priority portion 36, and a thread ready portion 38. Entry 32 represents an entry in storage circuitry 30 that corresponds to a single thread. In alternate embodiments, storage circuitry 30 may have any number of entries. In the illustrated embodiment, the thread identifier portion 34 of each entry in storage circuitry 30 is provided to thread switch control circuitry 26 by way of one or more conductors 35; the thread priority portion 36 of each entry in storage circuitry 30 is provided to thread switch control circuitry 26 by way of one or more conductors 37; and the thread ready portion 38 of each entry in storage circuitry 30 is provided to thread switch control circuitry 26 by way of one or more conductors 39.

Thread switch control 26 receives one or more signals 52 which indicate whether or not the currently executing instruction is a conditional yield instruction. In addition, thread switch control 26 receives one or more signals 50 which provide the priority selection bits if the currently executing instruction is a conditional yield instruction.

Control circuitry 24 also has storage circuitry 40 for storing state information for the currently executing thread. In one embodiment, the thread state information stored in storage circuitry 40 for the currently executing thread comprises a thread identifier portion 44, a thread priority portion 46, and a thread ready portion 48. In the illustrated embodiment, the thread identifier portion 44 in storage circuitry 40 is provided to thread switch control circuitry 26 by way of one or more conductors 45; the thread priority portion 46 of each entry in storage circuitry 40 is provided to thread switch control circuitry 26 by way of one or more conductors 47; and the thread ready portion 48 of each entry in storage circuitry 40 is provided to thread switch control circuitry 26 by way of one or more conductors 49.

Figure 4:
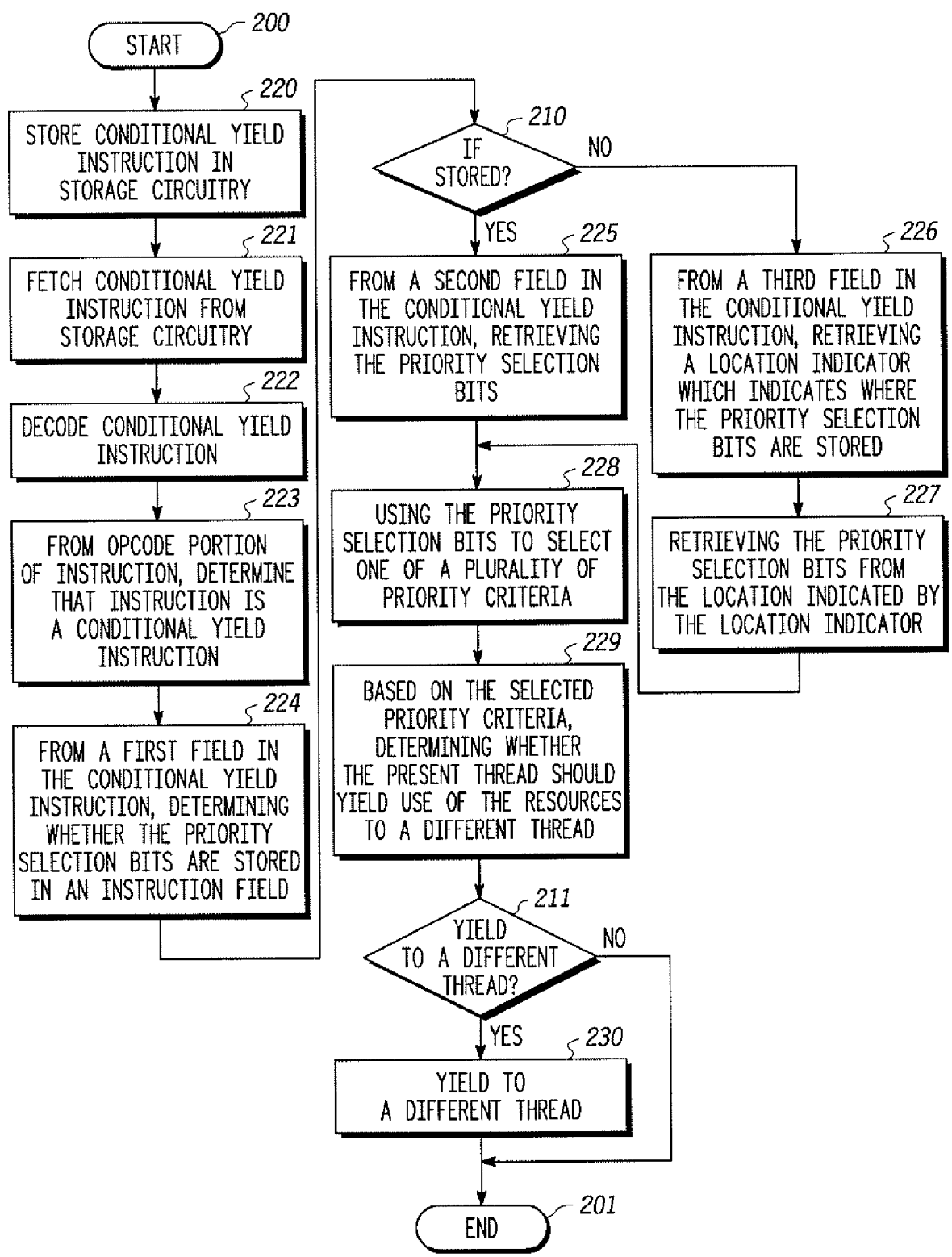
FIG. 4 illustrates, in flow diagram form, a method of operating processor 12 of FIG. 1 in accordance with one embodiment of the present invention.

FIG. 4 illustrates, in flow diagram form, a method of operating processor 12 of FIG. 1 in accordance with one embodiment of the present invention. In one embodiment, the flow starts at start oval 200 and proceeds to block 220 which states "store conditional yield instruction in storage circuitry". From block 220, the flow continues to block 221 which states "fetch conditional yield instruction from storage circuitry". From block 221, the flow continues to block 222 which states "decode conditional yield instruction". From block 222, the flow continues to block 223 which states "from opcode portion of instruction, determine that instruction is a conditional yield instruction". From block 223, the flow continues to block 224 which states "from a first field in the conditional yield instruction, determining whether the priority selection bits are stored in an instruction field".

From block 224, the flow continues to decision diamond 210 where the question is asked "if stored?". If the priority selection bits are stored in an instruction field, the "YES" path is followed to block 225 which states "from a second field in the conditional yield instruction, retrieving the priority selection bits". If the priority selection bits are not stored in an instruction field, the "NO" path is followed to block 226 which states "from a third field in the conditional yield instruction, retrieving a location indicator which indicates where the priority selection bits are stored". From block 226, the flow continues to block 227 which states "retrieving the priority selection bits from the location indicated by the location indicator". From both block 227 and block 225, the flow continues to block 228 which states "using the priority selection bits to select one of a plurality of priority criteria". From block 228, the flow continues to block 229 which states "based on the selected priority criteria, determining whether the present thread should yield use of the resources to a different thread". Some of the resources yielded to a different thread may include one or more of execution unit(s) 20 (see FIG. 2). From block 229, the flow continues to decision diamond 211 where the question is asked "yield to a different thread?". If the "YES" path is followed, the flow proceeds to block 230 which states "yield to a different thread". If the "NO" path is followed, the flow ends at END oval 201. From block 230, the flow proceeds to END oval 201 where the flow ends.

Figure 5:
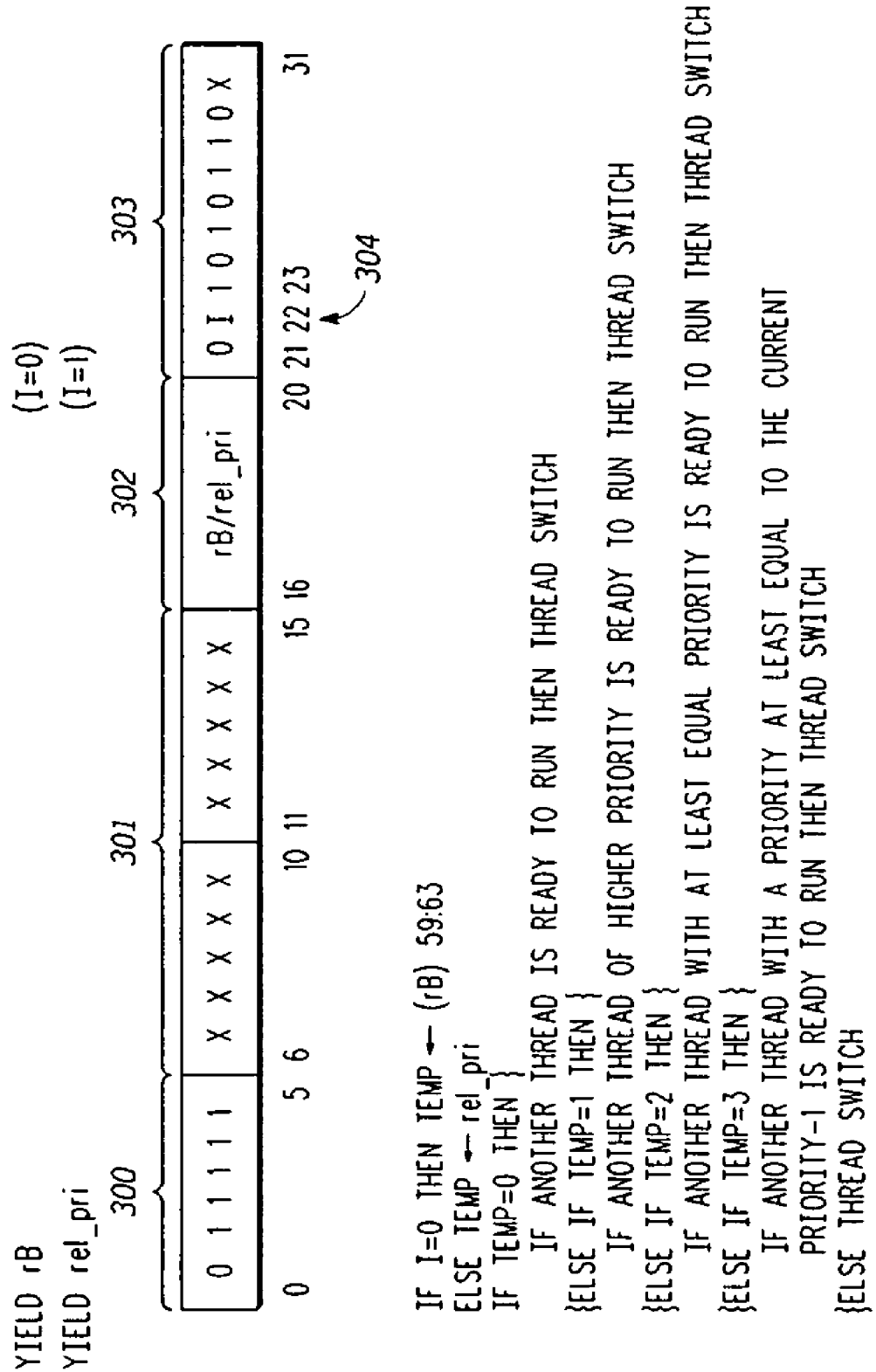
FIG. 5 illustrates, in block diagram form, a conditional yield instruction in accordance with one embodiment of the present invention.

FIG. 5 illustrates one embodiment of a conditional yield instruction. In this embodiment, portion 300 may be used as a primary opcode. Portion 301 (bits 6-15) and bit 31 are reserved and are not presently used. The value of these unused bits may be "don't cares", however some embodiments may require them to be a predetermined value (e.g. "0"). Portion 304 (bit 22) may be used to determine where the priority selection bits are located. For example, in the illustrated embodiment, if the I bit (bit 22) is a "1", then portion 302 of the conditional yield instruction itself directly contains the priority selection bits. However, in the illustrated embodiment, if the I bit (bit 22) is a "0", then portion 302 of the conditional yield instruction contains a location indicator which indicates the location of the priority selection bits. In the illustrated embodiment, the location indicator specifies one of a plurality of registers in register file 22 (see FIG. 2). Alternate embodiments may use the location indicator to specify the location of the priority selection bits in any desired manner, and the priority selection bits may be stored in any desired location either internal to or external to integrated circuit 10. Note that in the illustrated embodiment, portion 303 may be considered to be an extended opcode. Alternate embodiments may use any desired bits or portions of the instruction itself to as the opcode to determine that the instruction is a conditional yield instruction.

FIG. 5 lists a plurality of priority criteria that may be used in one embodiment. For the first priority criteria, if the priority selection bits have a first value (e.g. "0"), then the priority criteria is "if another thread is ready to run, then thread switch". For the second priority criteria, if the priority selection bits have a second value (e.g. "1"), then the priority criteria is "if another thread with higher priority is ready to run, then thread switch". For the third priority criteria, if the priority selection bits have a third value (e.g. "2"), then the priority criteria is "if another thread with at least equal priority is ready to run, then thread switch". For the fourth priority criteria, if the priority selection bits have a fourth value (e.g. "3"), then the priority criteria is "if another thread with priority at least equal to the current priority −1 is ready to run, then thread switch". Note that the current priority may be defined to be the priority of the currently executing thread, and the "current priority −1" may be defined to be one priority level lower than the current priority level.

An advantage of specifying a priority criteria in a relative manner as described above is that software need not be aware of the actual hardware embodiment, and the specifics of the hardware implementation of multiple priority levels. Instead, a relative priority specification in the conditional yield instruction may be interpreted by the hardware in an implementation-dependent manner. Alternate embodiments may use fewer, more, or different priority criteria. For example, an alternate embodiment may also use absolute priority levels as an example of a priority criteria. In an alternate embodiment, priority levels 1 . . . N may be available, and the priority criteria may specify a particular priority threshold in the range of 1 . . . N for ready to run threads to be selected for conditional thread switching.

Operation of the illustrated embodiment will now be described.

Referring to the flow diagram in FIG. 4, in the illustrated embodiment, the conditional yield instruction may be stored in memory 114 (see FIG. 1 and step 220 in FIG. 4). When the conditional yield instruction is fetched (see step 221), it may be transferred from memory 114 to the instruction queue 14 (see FIG. 2) by way of bus 120 (see FIG. 1). In alternate embodiments, instruction queue 14 may be any depth or could be a simple depth of one. From the instruction queue 14, the conditional yield instruction is transferred to decoder 16 by way of conductors 15. The decoder 16 decodes the relevant portions of the conditional yield instruction (see step 222). The opcode portions 300, 303 (see FIG. 5) of the conditional yield instruction may be used to determine and identify that this particular instruction is a conditional yield instruction (see step 223).

In the illustrated embodiment, one bit of the opcode, namely the "1" bit, bit 22, is used to determine where the priority selection bits are located (see step 224). For example, in the illustrated embodiment, if the I bit (bit 22) is a "1", then portion 302 of the conditional yield instruction itself directly contains the priority selection bits (see step 225). However, in the illustrated embodiment, if the I bit (bit 22) is a "0", then portion 302 of the conditional yield instruction contains a location indicator which indicates the location of the priority selection bits (see step 226). In the illustrated embodiment, the location indicator specifies one of a plurality of registers in register file 22 (see FIG. 2). If the I bit is a "0", the priority selection bits 50 are retrieved from register file 22 and provided to thread switch control 26 (see step 227). If the I bit is a "1", the priority selection bits 50 are retrieved from portion 302 of the conditional yield instruction and are provided to thread switch control 26 (see step 225).

Referring to step 229 of FIG. 4, thread switch control 26 (see FIG. 2) uses one or more conditional yield executing signals 52 to determine whether the presently executing instruction is a conditional yield instruction. If the presently executing instruction is a conditional yield instruction, then thread switch control circuitry 26 uses the priority selection bits 50 to select one of a plurality of priority criteria (e.g. plurality of priority criteria listed in FIG. 5). In one embodiment, thread switch control circuitry 26 does this by retrieving thread state information 34, 36, and 38 for other threads from storage circuitry 30 by way of conductors 35, 37, and 39, respectively. Similarly, thread switch control circuitry 26 retrieves thread state information 44, 46, and 48 for the currently executing thread from storage circuitry 40 by way of conductors 45, 47, and 49, respectively. Thread switch control 26 compares the priority 46 of the currently executing thread to the priorities of the other threads (36) which are ready to run (bit 38 is asserted). In the illustrated embodiment, thread switch control compares 46 to 36 for the entries in storage circuitry 30 that have bit 38 asserted. Then, based on the priority criteria selected by the priority selection bits 50, thread switch control circuitry 26 determines whether or not a thread switch should take place, and if so, to which thread.

If thread switch control circuitry 26 determines that a thread switch should not take place ("NO" path from decision diamond 211), execution of the conditional yield instruction is completed and execution of the currently executing thread continues. However, if thread switch control circuitry 26 determines that a thread switch should take place, execution of the conditional yield instruction is completed and processor 12 instruction execution continues with the newly selected thread selected by thread switch control circuitry 26 (see step 230). Note that in the illustrated embodiment, the actual thread switching is performed after execution of the conditional yield instruction completes. However, for alternate embodiments, the thread switching may occur during completion of the conditional yield instruction.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Although the embodiments of the present invention described above have been described in the context of a conditional yield instruction for multi-threading and context switching, alternate embodiments may not use multi-threading and context switching. Any device that is capable of executing an instruction may use the present invention. In addition, a conditional yield instruction may be used for power management purposes. For example, if all threads yield after executing a conditional yield instruction, the processor 12 or the integrated circuit 10 may want to power down in order to conserve power. Alternate embodiments may implement one or more types of conditional yield instructions, and these various conditional yield instructions may be used for any desired purpose.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method for operating an integrated circuit having a processor, the method comprising:
   representing an instruction of the processor using a plurality of bits;
   using a first portion of the plurality of bits to determine that the instruction is a conditional yield instruction;
   using a second portion of the instruction to determine where at least one priority selection bit is located;
   when the second portion of the instruction determines that the at least one priority selection bit is located in the instruction itself, using a third portion of the instruction to store the at least one priority selection bit;
   when the second portion of the instruction determines that the at least one priority selection bit is not located in the instruction itself, using a register to store the at least one priority selection bit;
   using the at least one priority selection bit to select a selected priority criterion from a plurality of priority criteria;
   when the selected priority criterion is a first criterion, comparing a priority of a currently executing thread with a priority of a second thread that is ready to run to produce a comparison result; and
   when the selected priority criterion is the first criterion, using the comparison result to determine if the currently executing thread should yield to the second thread, wherein the step of using the comparison result to determine if the currently executing thread should yield to the second thread comprises yielding to the second thread when the priority of the second thread is higher than the priority of the currently executing thread,
   wherein none of the plurality of priority criteria produce a change in priority of any thread.

2. A method as in claim 1, wherein the selected priority criterion comprises whether the second thread is ready to run.

3. A method as in claim 1, wherein the conditional yield instruction uses "yield" as its mnemonic.

4. A method as in claim 1, further comprising:
   when the selected priority criterion is a second criterion, causing the currently executing thread to yield to the second thread regardless of the priority of the currently executing thread and regardless of the priority of the second thread.

5. A method as in claim 1, wherein the step of using the comparison result to determine if the currently executing thread should yield to the second thread comprises continuing to execute the currently executing thread when the priority of the second thread is equal to the priority of the currently executing thread.

6. A method as in claim 1, further comprising:
providing storage circuitry for storing thread state information.

7. A method as in claim 6, wherein the thread state information comprises a thread identifier.

8. A method as in claim 6, wherein the thread state information comprises a thread priority portion.

9. A method as in claim 6, wherein the thread state information comprises a thread ready portion.

10. An apparatus, comprising:
first storage circuitry for storing an identifier for a currently executing thread;
second storage circuitry for storing a priority value for the currently executing thread;
third storage circuitry for storing an identifier for a second thread;
fourth storage circuitry for storing a priority value for the second thread;
fifth storage circuitry for storing a ready value for the second thread;
at least one priority selection bit; and
control circuitry, coupled to the first, second, third, fourth, and fifth storage circuitry, and coupled to receive the at least one priority selection bit,
wherein the control circuitry uses the at least one priority selection bit to select one of a plurality of priority criteria,
wherein the one of the plurality of priority criteria comprises when another thread with priority at least equal to the priority value for the currently executing thread minus one is ready to run, then thread switch,
wherein during execution of a conditional yield instruction, said control circuitry uses both the ready value for the second thread and the at least one priority selection bit in determining whether the currently executing thread should yield at least one resource to the second thread,
wherein no value of the one or more priority selection bits results in a change in priority of the currently executing thread.

11. An apparatus as in claim 10, further comprising:
sixth storage circuitry for storing an identifier for a third thread;
seventh storage circuitry for storing a priority value for the third thread; and
eighth storage circuitry for storing a ready value for the third thread,
wherein during execution of the conditional yield instruction, when the control circuitry compares the priority value for the currently executing thread and the priority value for the second thread, said control circuitry uses the at least one priority selection bit to determine how to compare the priority value for the currently executing thread and the priority value for the second thread,
wherein during execution of the conditional yield instruction, when both the ready value for the second thread and the at least one priority selection bit indicate that a comparison is needed, the control circuitry compares the priority value for the currently executing thread and the priority value for the second thread and produces a comparison result,
wherein during execution of the conditional yield instruction, when the control circuitry produces the comparison result, the comparison result is used in determining whether the currently executing thread should yield at least one resource to the second thread,
wherein during execution of the conditional yield instruction, said control circuitry uses both the ready value for the third thread and the at least one priority selection bit in determining whether the currently executing thread should yield at least one resource to the third thread,
wherein during execution of the conditional yield instruction, when the control circuitry compares the priority value for the currently executing thread and the priority value for the third thread, said control circuitry uses the at least one priority selection bit to determine how to compare the priority value for the currently executing thread and the priority value for the third thread,
wherein during execution of the conditional yield instruction, when both the ready value for the third thread and the at least one priority selection bit indicate that a comparison is needed, the control circuitry compares the priority value for the currently executing thread and the priority value for the third thread and produces a second comparison result, and
wherein during execution of the conditional yield instruction, when the control circuitry produces the second comparison result, the second comparison result is used in determining whether the currently executing thread should yield at least one resource to the third thread.

12. An apparatus as in claim 10, wherein the a second one of the plurality of priority criteria comprises when another thread with priority at least equal to the priority value for the currently executing thread is ready to run, then thread switch.

13. An apparatus as in claim 12, wherein a third one of the plurality of priority criteria comprises when another thread with higher priority is ready to run, then thread switch.

14. An apparatus as in claim 13, wherein the conditional yield instruction is never able to change thread priority.

15. An apparatus as in claim 10, wherein the at least one resource comprises an execution unit.

* * * * *